(12) United States Patent
Ebert et al.

(10) Patent No.: US 9,265,264 B2
(45) Date of Patent: Feb. 23, 2016

(54) CLIPPING MACHINE WITH IMPROVED HANDLING OF SUSPENSION ELEMENTS

(71) Applicant: Poly-clip System GmbH & Co. KG, Hattersheim (DE)

(72) Inventors: Detlef Ebert, Bad Nauheim (DE); Thorsten Würth, Kelkheim (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 0 days.

(21) Appl. No.: 14/620,357

(22) Filed: Feb. 12, 2015

(65) Prior Publication Data

US 2015/0223478 A1     Aug. 13, 2015

(30) Foreign Application Priority Data

Feb. 12, 2014  (EP) .................................... 14154881

(51) Int. Cl.
| | |
|---|---|
| *A22C 11/00* | (2006.01) |
| *A22C 11/12* | (2006.01) |
| *A22C 11/02* | (2006.01) |
| *A22C 15/00* | (2006.01) |

(52) U.S. Cl.
CPC ............... *A22C 11/125* (2013.01); *A22C 11/02* (2013.01); *A22C 11/127* (2013.01); *A22C 15/002* (2013.01)

(58) Field of Classification Search
CPC ........ A22C 11/00; A22C 11/02; A22C 11/10; A22C 11/122; A22C 11/127
USPC .................. 452/30–32, 35–37, 46–49, 51
See application file for complete search history.

(56) References Cited

U.S. PATENT DOCUMENTS

| | | | |
|---|---|---|---|
| 5,269,116 A | 12/1993 | Roberts et al. | |
| 7,708,624 B2 * | 5/2010 | Ebert ...................... | B65B 51/04 452/48 |
| 8,540,555 B2 * | 9/2013 | Reitz .................... | A22C 11/127 452/46 |
| 8,747,192 B2 * | 6/2014 | Sames .................. | A22C 15/001 452/51 |
| 8,808,066 B2 * | 8/2014 | Haschke .............. | A22C 11/125 452/48 |
| 2005/0245187 A1 | 11/2005 | Steinke et al. | |

FOREIGN PATENT DOCUMENTS

EP     0963699        12/1999

OTHER PUBLICATIONS

European Search Report and the European Search Opinion Dated Jul. 4, 2014 From the European Patent Office Re. Application No. 14154881.8.

* cited by examiner

*Primary Examiner* — Richard Price, Jr.

(57) ABSTRACT

A clipping machine for producing sausage-shaped products (S), like sausages, by filing a flowable filling material into a tubular or bag-shaped packaging casing (M) and closing said packaging casing (M) by a closure means, like a closure clip (C). The clipping machine (1) comprises a feeding device (50) for suspension elements configured to feed suspension elements (E) attached to a carrier strip (B) to a delivery position and to place a first section of a suspension element (E) within the closure means (C) positioned on the die (25) of the second closing tool (24). The feeding device (50) further comprises a guiding device (51) configured to hold down the suspension element (E) close to the carrier strip (B) while the suspension element (E) is pulled off and detached from the carrier strip (B) by a relative movement between the second clipping tool (24) and the feeding device (50). A holding device (60) attached to the second clipping tool (24) is configured to releasably receive and hold a second section of the suspension element (E) when detached from the carrier strip (B).

11 Claims, 7 Drawing Sheets

CLIPPING MACHINE WITH IMPROVED HANDLING OF SUSPENSION ELEMENTS

RELATED APPLICATION

This application claims the benefit of priority of European Patent Application No. 14154881.8-1655 filed Feb. 12, 2014, the contents of which are incorporated herein by reference in their entirety.

FIELD AND BACKGROUND OF THE INVENTION

The present invention relates to a clipping machine for producing sausage-shaped products, according to the preamble of independent claim 1.

In particular, the present invention relates to a clipping machine for producing sausage-shaped products, like sausages, by filing a flowable filling material into a tubular or bag-shaped packaging casing and closing said packaging casing by a closure means, like a closure clip. The clipping machine comprises a filling tube for feeding the filling material into the tubular or bag-shaped packaging casing stored on the filling tube and closed at its first end, gathering means for gathering the filled tubular or bag-shaped packaging casing and for forming a plait-like portion thereto, and a clipping device having a first and a second closing tool both reversibly movable relative to each other between an opened position and a closed position, for applying at least one closure means to the plait-like portion and closing said closure means when the closing tools are in their closed position.

In practice, it is known that, for example in the production of sausage-shaped products, like sausages, the clipping machine may further comprise a feeding unit for feeding flexible suspension elements, like loops, to the clipping unit for being attached to the sausage-shaped product by a clip by means of the first or second closure means, the feeding unit includes a positioning device for positioning the flexible suspension element to be attached to the sausage-shaped product.

For example, a production line for producing sausage-shaped products is known from German laid-open patent specification 10 2006 30 041 829, in which the sausage-shaped products receive a free-flowing filling material, such as sausage meat, sealing compound, granulate or the like in a tubular casing material. This prior art production line contains a clipping machine, in which the casing material stuffed with filling material is portioned into single sausage-shaped products by constricting (gathering) the casing and placing closure clips in the constricted region, wherein at least one flexible suspension element that is fed in synchrony to the clipping machine may be attached to the sausage-shaped product when placing a clip. The suspension elements are formed, for example, by thread loops and lie on a carrier strip which is coated on one side with an adhesive, from which they are pulled off singly in the clipping machine by a lower die (second closing tool) of a clip placement and clip closing machine. In these prior art feeding devices for flexible suspension elements there is a risk, however, that the suspension elements may be ejected from the lower die of the closing tools or from the clip by the impulse that is imparted to them when they are detached from the carrier strip. This leads to the suspension elements not being properly fixed to the sausage-shaped product. Unwanted downtime and lost production are the consequence. The suspension elements twirling about can also catch in other parts of the machinery, which likewise results in additional downtime and lost production.

In order to reduce the above mentioned risk of ejecting the suspension element when being detached from the carrier strip, from U.S. Pat. No. 8,540,555 a feeding device for suspension elements is known, comprising, in the region of the delivery position for the suspension elements where the suspension elements are detached from the carrier strip by the closing tool of the clipping machine, a guiding device (so called holding-down device) arranged above the carrier strip. The guiding device contains a holding-down element which can be laid reversibly upon at least the suspension element located at the delivery position, wherein the holding-down element covers the suspension element at least in portions thereof. Such a guiding device holds down the suspension element that has just been pulled off the carrier strip approximately as long as required until it has been fixed by means of a closure clip to the sausage-shaped product and has been carried out of the clipping zone of the clipping machine. In this way, the suspension element can be reliably prevented from twirling around and catching in other parts of the machinery. However, if small or short suspension elements are to be attached to the product, the moving distance of the of the closing tool pulling the suspension element off the carrier strip may be longer than the length of the suspension element covered by or arranged under the holding down element, so that the suspension element is drawn away from the guiding device before the clip is closed by the closing tools. In this case, the end of the suspension element E opposite to its end picked up in the closing clip is not guided any more before the closing clip is closed, if the relation of length of suspension element E to the moving distance of the second closing tool. Thus, there is still a risk that the suspension element may be subjected to uncontrolled movements and may even jump out of the clip or the closing tool before the clip is closed.

SUMMARY OF THE INVENTION

Thus, it is an object of the present invention to eliminate or at least reduce the above mentioned risk and to provide a clipping machine having an improved reliability and accuracy when attaching a suspension element to a product.

According to a first embodiment of the present invention, there is provided a clipping machine for producing sausage-shaped products, like sausages, by filing a flowable filling material into a tubular or bag-shaped packaging casing and closing said packaging casing by a closure means, like a closure clip. The clipping machine comprises a filling tube for feeding the filling material into the tubular or bag-shaped packaging casing stored on the filling tube and closed at its first end, gathering means for gathering the filled tubular or bag-shaped packaging casing and for forming a plait-like portion thereto, and a clipping device having a first and a second closing tool, at least one of which being reversibly movable between an opened position and a closed position, wherein at least the second closing tool comprises a die configured to receive at least one closure means, and wherein the closing tools are configured to apply at least one closure means to the plait-like portion and closing said closure means when the closing tools are brought into their closed position. The clipping device further comprises a feeding device for suspension elements configured to feed suspension elements attached to a carrier strip to a delivery position and to place a first section of a suspension element within the closure means positioned on the die of the second closing too. The feeding device further comprises a guiding device configured to hold down the suspension element close to the carrier strip while the suspension element is pulled off and detached from the carrier strip by a relative movement between the second clipping tool and the feeding device. A holding device attached to the second clipping tool and configured to releasably receive and hold a second section of the suspension element when detached from the carrier strip.

With this embodiment of clipping machine, all kinds of suspension elements of arbitrary length are reliably prevented from uncontrolled movements after detaching from the carrier strip so that the suspension elements are hold in a well defined position until the closure means (closure clip) is closed by the first and second closing tools and the suspension element is attached to the sausage-shaped product by the closure means in a well defined position. This is also advantageous when the closing tools are opened again and the plait-like portion is cut through to separate the sausage-shaped product for conveying the sausage-shaped product to the next production station, wherein the suspension element may be easily threaded on a transport bar or the like because the position and movement of the suspension element is well defined during opening of the closing tools, too.

In a further development of the invention, the holding device comprises at least one comb-like or brush-like element having at least one row of teeth or bristles configured to receive and releasably hold the second section of the suspension element therebetween. Thus, the suspension element is hold by a clamping effect between the teeth or bristles. Alternatively, the holding device may comprise other devices configured to releasably hold the second section of the suspension element, such as, for example, a suction device holding the suspension element by means of a suction effect generated by a plurality of openings in the surface of the holding device through which air is sucked in.

In a further independent development of the invention, the feeding device further comprises an urging element arranged to pass the holding device and to urge the second section of the suspension element into engagement with the holding device while the first and second closing tools are brought into their closed position. Preferably, the urging device is attached to the guiding device.

The teeth or bristles of the comb-like or brush-like element are may be resilient. Thus, the suspension element may be urged between the resilient teeth or bristles clamping it therebetween by a spring force of the teeth or bristles. Alternatively, the teeth or bristles may be substantially rigid and the suspension element may be resilient so as to provide a similar clamping effect. It is also possible, but not necessary, to provide the teeth or bristles of the comb-like or brush-like element with a variable cross-section having a thicker tip and a thinner shaft so as to achieve a kind of snapping effect when urging the suspension element between the bristles or teeth. Other forms of the teeth or bristles are feasible, too, for enhancing easy and reliable engagement of the suspension element at the holding device.

Alternatively or additionally the urging element may be resilient. Thus the suspension element may be urged into engagement with the holding element in a gentle manner reducing the risk of damaging the suspension element.

If at least one of the urging element and the teeth or bristles of the comb-like or brush-like element are resilient, the urging element may be arranged to contact the teeth or bristles of the comb-like or brush-like element while passing the holding device. In this manner, a very reliable engagement between the suspension element and the holding device can be assured because the suspension element may be pressed deeply between the teeth or bristles without any risk of damaging the urging element or the holding device. Alternatively, both the urging element and the teeth or bristles of the comb-like or brush-like element may be substantially rigid. In this case, to avoid any damage, the urging element is configured not to contact the while the comb-like or brush-like element passes the same during the closing motion of the second closing tool.

The suspension element is urged between the teeth or bristles of the comb-like or brush-like element when the passing distance between the urging element and the comb-like or brush-like element is smaller than the diameter of the second section (thread portions) of the suspension element.

In a further development of the above invention, the urging element may be inclined with respect to the at least one row of the at least one comb-like or brush-like element so as to pass the teeth or bristles of the at least one comb-like or brush-like element one after another. In this manner, the two threads of the second section of the suspension element, which is a loop, are urged into engagement with the holding element one after another. Thus, the forces applied acting onto the urging element and onto the comb-like or brush-like element are reduced and distributed over a longer time interval so that noise and stress to the material are reduced. This enables a less bulky construction of the feeding device and the comb-like or brush-like element.

In a further development of the invention, the teeth or bristles of the comb-like or brush-like element may extend substantially perpendicular to the direction of the relative movement between the second closing tool and the feeding device. This results in substantially equal forces acting on the urging element and the comb-like or brush-like element when passing each other in both directions during opening or closing of the closing tools. Also similar forces are necessary for engaging and disengaging the suspension element and the holding element during closing motion and reversed opening motion of the closing tools.

Alternatively the teeth or bristles of the comb-like or brush-like element may extend inclined with respect to the direction of the relative movement between the second closing tool and the feeding device. This may be preferred if different forces for engaging and disengaging the suspension element and the holding element are desirable, for example.

In a further development of the invention, the at least one comb-like or brush-like element may comprise at least two rows of teeth or bristles having different configurations of teeth or bristles, preferably different thickness and/or different spacing of the teeth or bristles. In this manner, it is possible to use the same holding device for different kinds of suspension elements having different thread diameters or different thread materials, for example, without requiring change of the holding device. Furthermore, this configuration may be advantageous in that is enhances reliability of engagement even if the dimensions of the suspension element changes on grounds of fabrication tolerances.

In a further independent development of the invention, the feeding device for suspension elements is arranged on the side of the closing tools facing the filling tube.

Further advantages and preferred embodiments will be described in the following together with the drawings listed below. The expressions "left", "right", "below" and "above" used in the following description, are referred to the drawings in an alignment such that the reference numbers and the notation of the drawing figures used can be read in normal orientation.

DESCRIPTION OF SPECIFIC EMBODIMENTS OF THE INVENTION

In the following, a preferred embodiment of the clipping machine will be explained with reference to the drawing figures.

Figure 1:
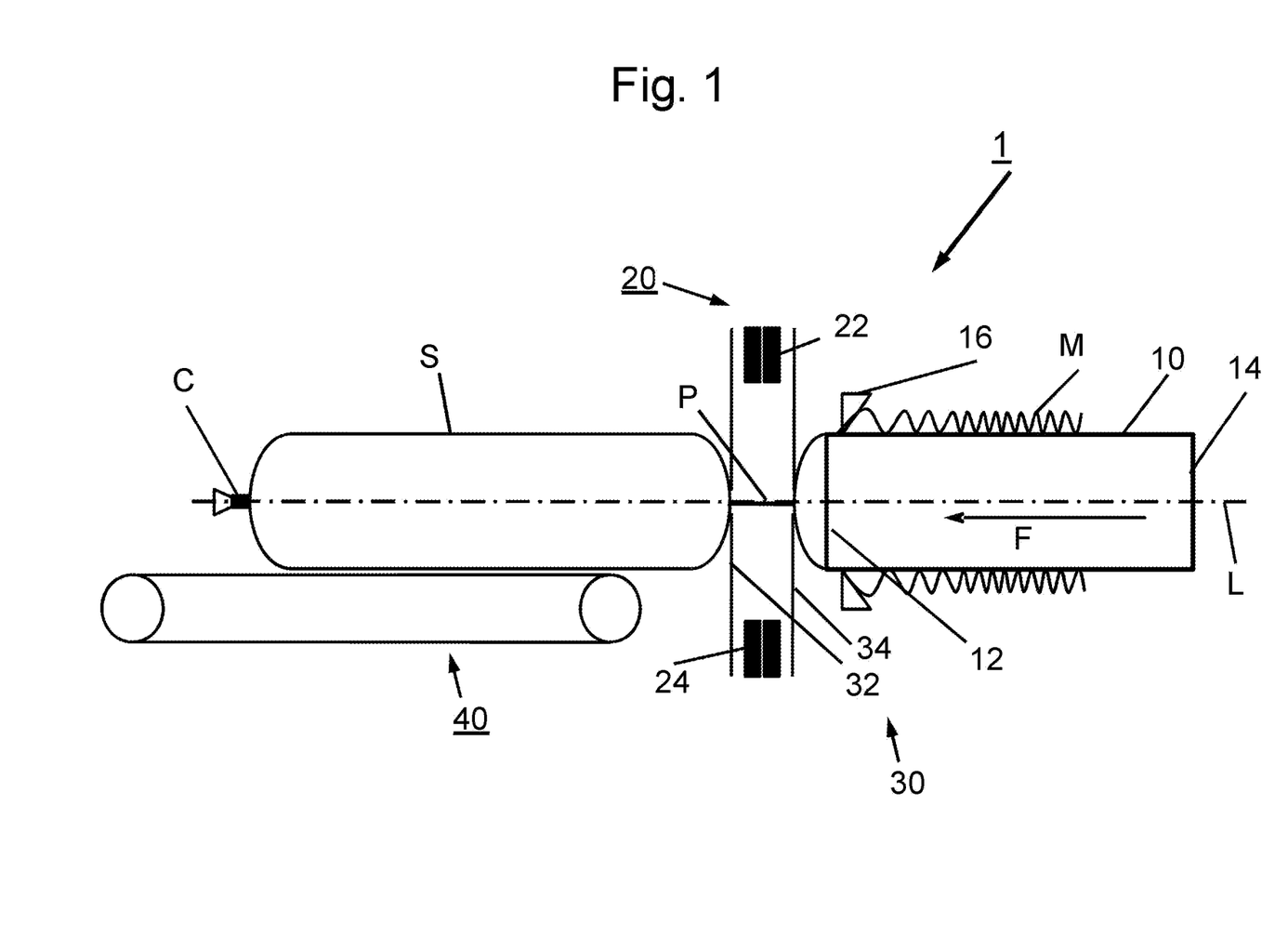
FIG. 1 is a schematic view to the clipping machine according to the present invention, wherein the tubular packaging casing is filled and gathered.

The clipping machine 1 for producing sausage-shaped products S according to FIG. 1, comprises as main components a circular cylindrical filling tube 10 having a longitudinally extending central axis A and being made of stainless steel, wherein tubular packaging casing M made of a thin sheet material is stored on the filling tube 10, gathering means 30 for gathering the filled tubular packaging casing M and for forming a plait-like portion thereto are arranged downstream filling tube 10, and a clipping device 20 for closing the filled tubular packaging casing M by applying a closure means, like a closure clip C, to said plait-like portion P.

As it can be inferred from FIG. 1, horizontally arranged filling tube 10 has a left end 12 facing clipping device 20 and a right end 14 coupled to a filler arrangement (not shown in FIG. 1) including a pump for feeding filling material through filling tube 10 in a feeding direction F. A casing brake device 16 is arranged on filling tube 10 in the vicinity of left end 12 of the filling tube 10 in order to control the movement of tubular packaging casing M when pulled-off from filling tube 10 by the filling pressure.

Positioned immediately downstream left end 12 of filling tube 10, clipping device 20 is arranged and coaxially aligned to filling tube 10. Clipping device 20 comprises a first and a second closing tool (clipping tool) 22, 24, wherein each closing tool includes at least one punch or one die, respectively. Preferably, the first closing tool 22 includes two punches or a double punch and the second closing tool 24 includes two dies 25 (or a double die) for applying two adjacent closing clips in a certain distance to each other to said plait-like portion P. Gathering means 30 includes a first displacer unit 32 and a second displacer unit 34, wherein first displacer unit 32 is positioned downstream second displacer unit 34. The first and the second closing tools 22, 24 of clipping device 20 are positioned between first and second displacer units 32, 34, and are driven in known manner by a drive device (not shown) between an opened position and a closed position.

Furthermore, for discharging sausage-shaped product S just produced from the clipping machine 1, downstream clipping device 20, a transportation device or belt conveyor 40 is arranged, comprising a conveyor belt and guide rollers. Transportation direction T of belt conveyor 40 coincides with feeding direction F. The height of the upper conveyor belt section of conveyor the belt is aligned to the lower side of the sausage shaped product S to be produced and discharged from clipping machine 1.

For producing sausage-shaped products S, as known in the art, filling material is fed through filling tube 10 into tubular packaging casing M which is closed at its front end by a closure clip C. After a predetermined portion of filling material is fed into tubular packaging casing M, gathering means 30, in particular, first and second displacer units 32, 34 forms a plait-like portion P to the tubular packaging casing M. Thereafter, two closure clips C are attached to the plait-like portion P by the closing tools 22, 24, a first closure clip C in order to close the just filled section of the tubular casing packaging M, and the second closure clip C in order to close the front end of the remaining tubular packaging casing M.

When the closing tools 22, 24 are in their opened position, one closure clip C is received in each die 25 of the lower closing tool 24 (in FIGS. 2 to 7 only one lower closing tool 24 is shown). For applying a closure clip C to the plait-like portion P, and for closing said closure clip C between the die and the punch of each closing tool, first and second closing tools 22, 24 are moved towards the plait-like portion P. Then, for example, a cutting device (not shown) is driven against the plait-like portion P of the tubular packaging casing M between the closing tools 22, 24 so as to separate a sausage-like product S. Thereafter, the closing tools 22, 24 are opened again and the separated sausage-like product S is discharged from the clipping machine 1. During application to the continuously moving casing M, the clipping device 20 may move in feeding direction F synchronously to the casing M, while it may return to the starting position near the filling tube 10 after discharging the sausage-like product S from the clipping machine 1.

Figure 2:
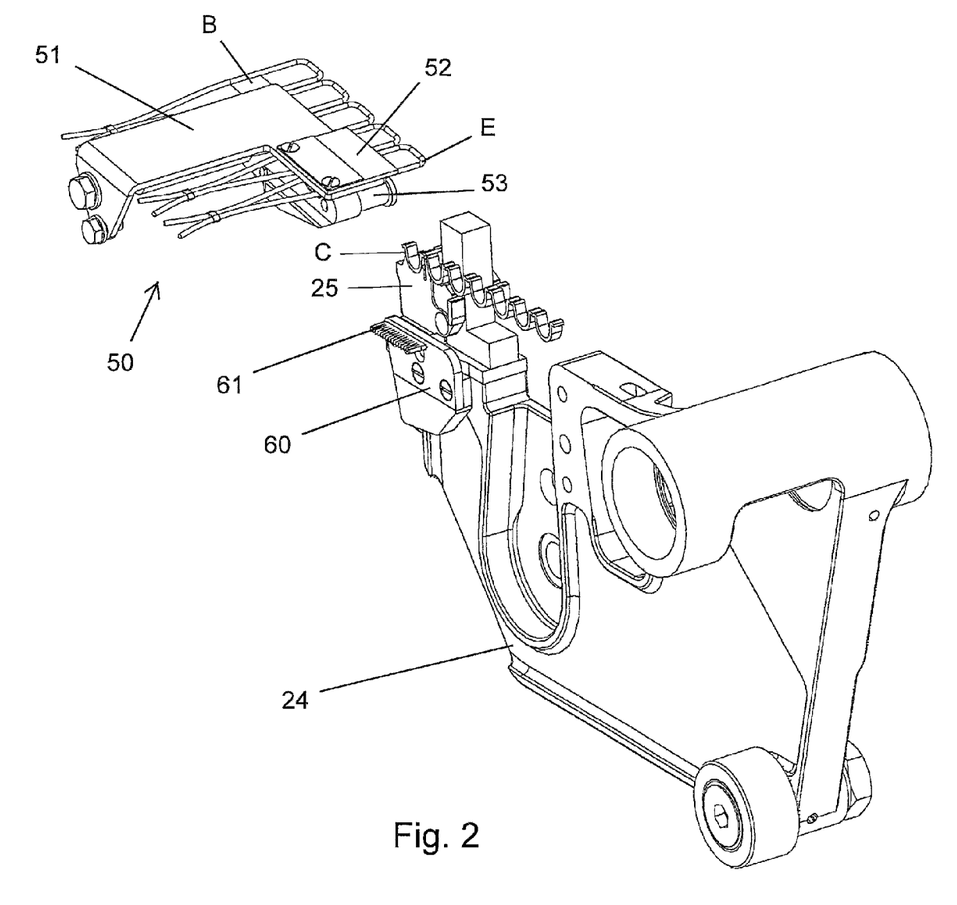
FIG. 2 is a perspective view showing a closing tool and a feeding device for suspension elements of a preferred embodiment of the clipping machine according to the invention.
Figure 3:
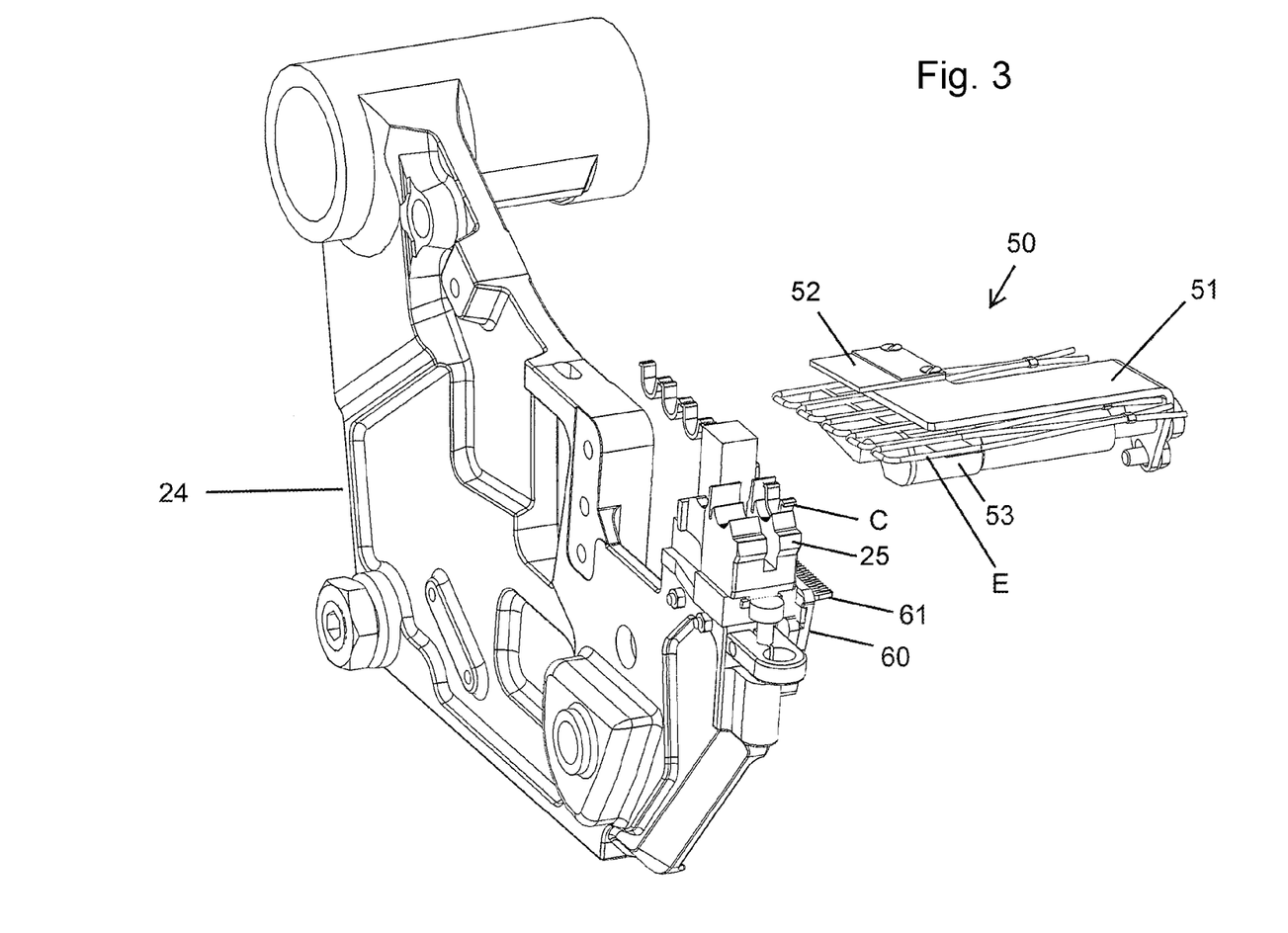
FIGS. 3, 4, 5, 6 and 7 are perspective views showing consecutive stages of operation of the closing tool and the feeding device for suspension elements of FIG. 2.
Figure 4:
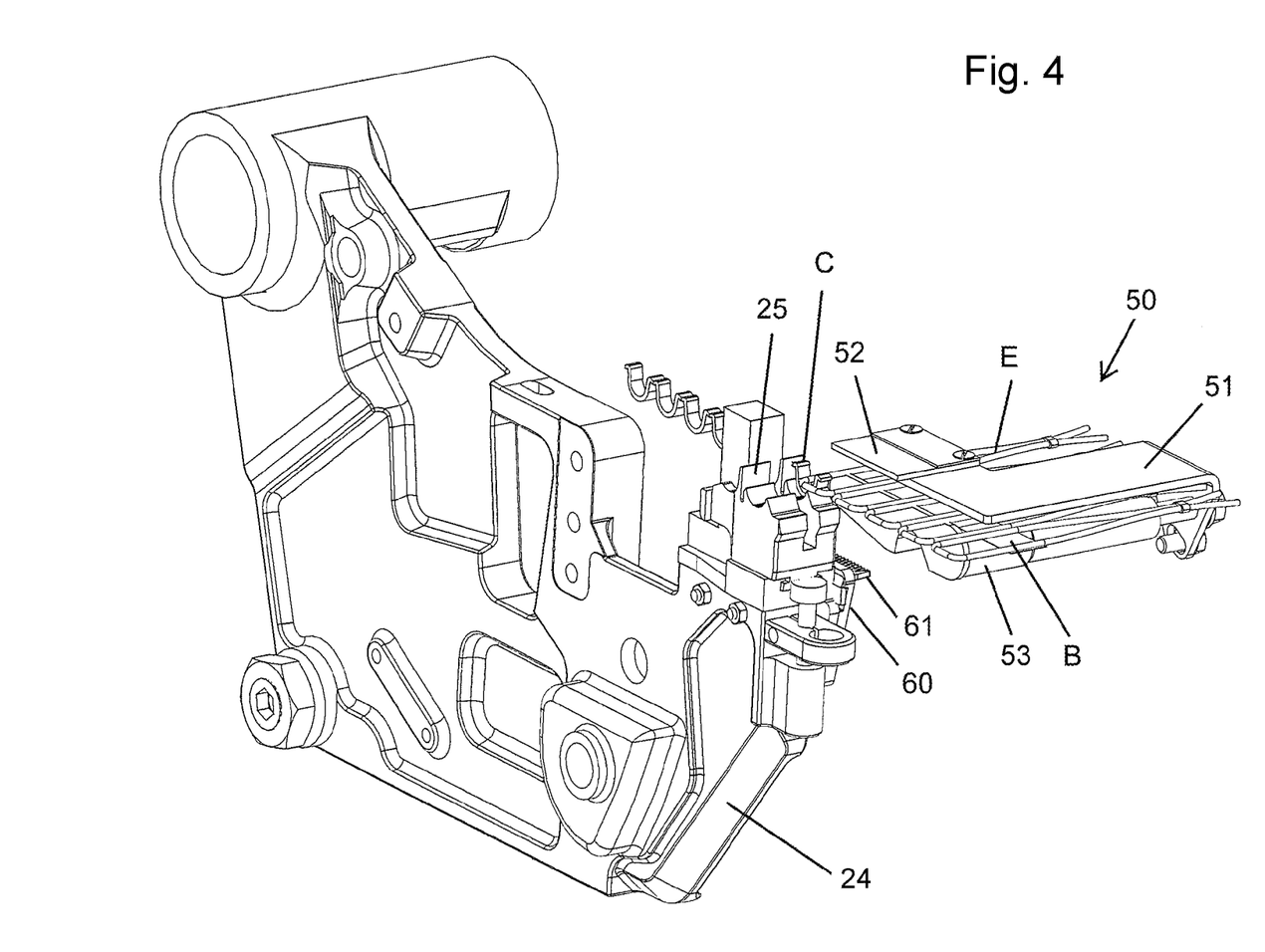

As shown in FIG. 2, the clipping machine according to the invention comprises a feeding device 50 for feeding suspension elements E attached to a carrier strip B to a delivery position. The feeding device 50 comprises a conveying device 53 for supporting and moving the carrier strip B so as to move a suspension element E into the delivery position. In the delivery position, the suspension element E is located in the moving path of the second closing tool 24 so that a first section of the suspension element (i.e. the right end of the suspension element E in FIG. 2) will be picked up by the closing clip C residing on the die 25 of the second closing tool 24. One leg of the loop of the suspension element E is received within the closing clip C while the second closing tool 24 moves from its starting position shown in FIG. 3 in direction to its closed position. This intermediate state is shown in FIG. 4. In other words, a first section of the suspension element E is placed by the feeding device 50 within the closure clip C residing in the die 25 of the moving closing tool 24.

Figure 5:
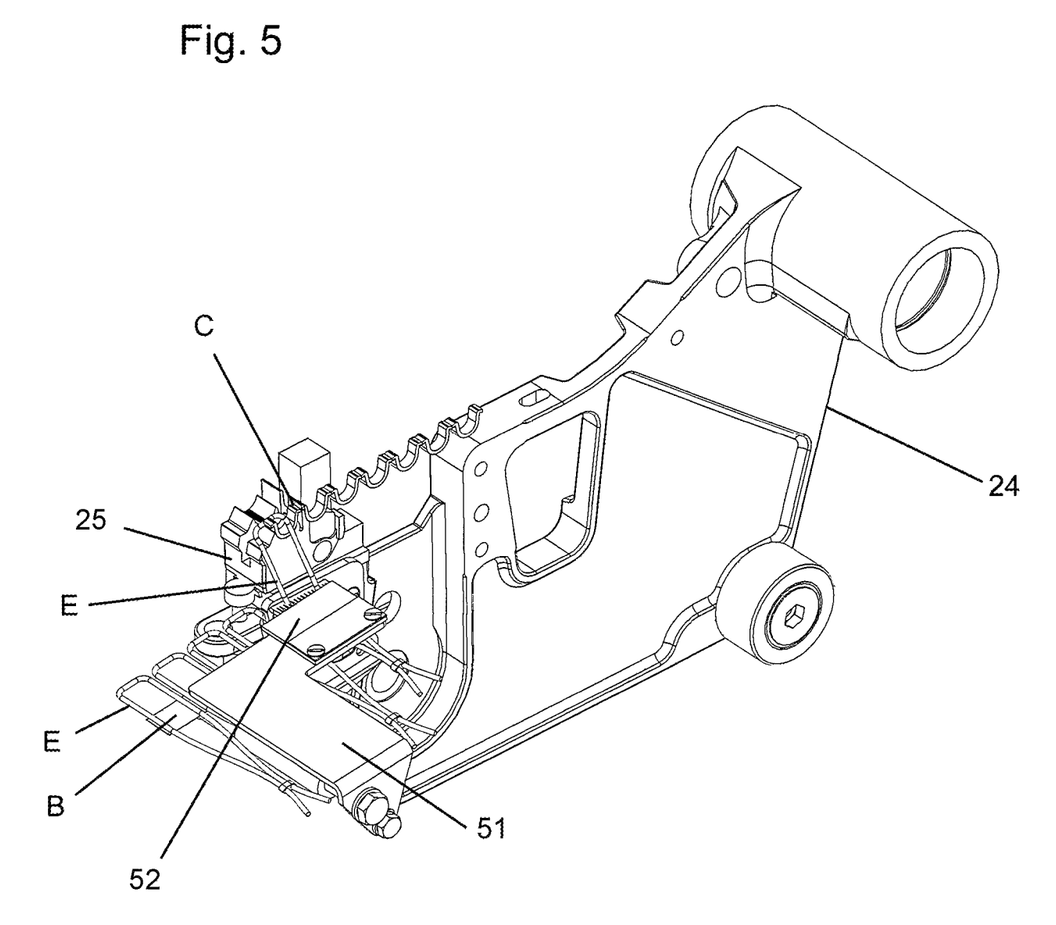
Figure 6:
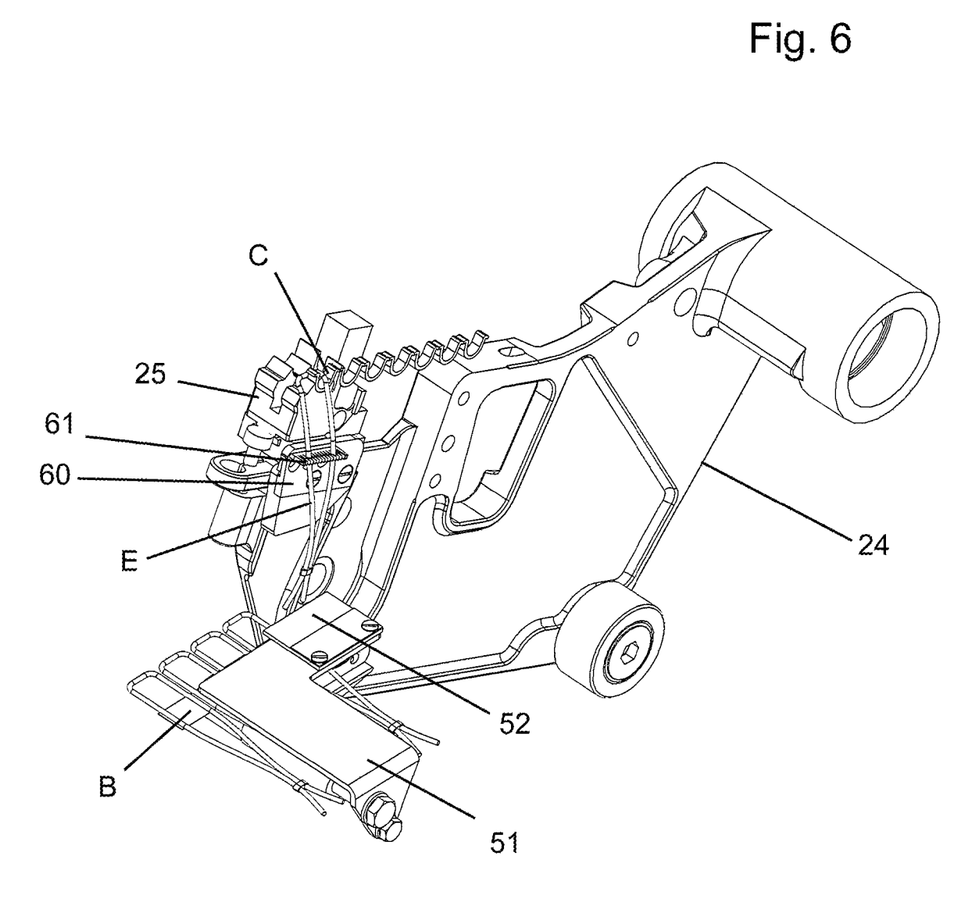
Figure 7:
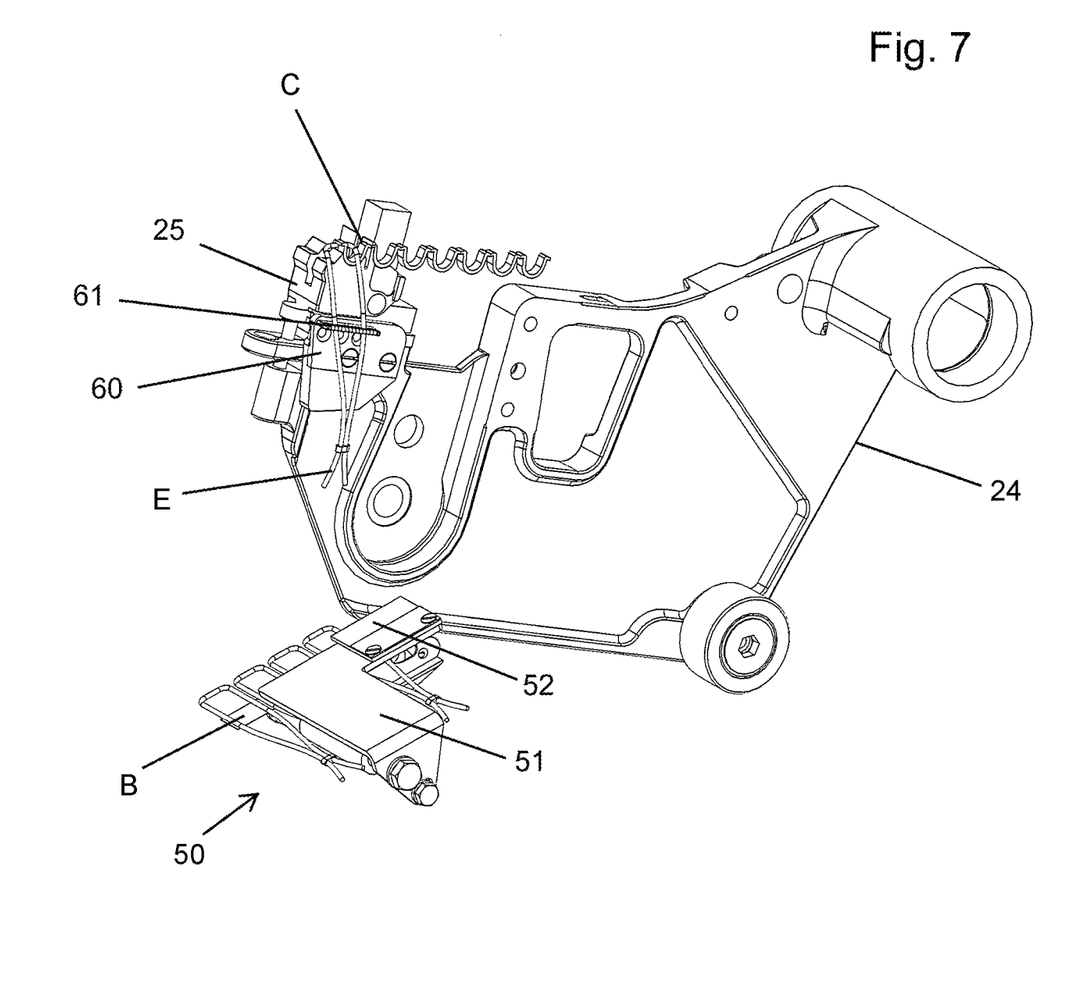

As shown in FIGS. 5 to 7, while the second closing tool 24 continues moving to its closed position, the suspension element E is drawn away and detached from the carrier strip B. At the time of detachment, due to inherent elastic characteristics of the suspension element E and the carrier strip B, the suspension element E is subjected to a so called detaching impulse resulting in a sudden acceleration of the suspension element E, in particular the end of element E remote from the closing clip C, in direction away from the carrier strip C, i.e. upwards in FIG. 2. In order to avoid such uncontrolled movements of the suspension element E caused by that detaching impulse, the feeding device 50 further comprises a guiding device 51 configured to hold down the suspension element E close to the carrier strip B while the suspension element E is pulled off and detached from the carrier strip B by the relative movement between the second clipping tool 24 and the feeding device 50. As shown in FIG. 2, the guiding device 51 may comprise a plate-like element arranged above the conveying device 53 so as to sandwich the carrier strip B between the conveying device 53 and the guiding device 51. The guiding device 51 is configured such that the suspension element E is prevented from jumping up after detachment and a second portion (preferably the intermediate portion) of the suspension element E is moved close along the closing tool 24 while the closing tool 24 is moving upward to its closed position. The guiding device 51 may be applied to the carrier strip B with a certain spring force which is strong enough to prevent uncontrolled movements of the suspension element E, but weak enough to allow pulling out the suspension element E between the guiding device 51 and the conveying device 53. Alternatively, the guiding device 51 may be positioned in a short distance above the carrier strip B so that it does not apply a clamping force onto the carrier strip B. In any way, the guiding device 51 will prevent jumping up of the suspension element E at the moment of detachment from the carrier strip B.

As also shown in FIG. 2, the second closing tool 24 further comprises a holding device 60 attached to the second closing tool 24. Preferably, as shown in FIG. 2, the holding device 60 is releasably mounted to the closing tool 24 so that it can be replaced if necessary. Preferably, this holding device 60 is arranged in proximity to the die 25. In any way it is arranged in a position suitable to receive the second portion of the suspension element E while the suspension element E is pulled away from the carrier strip by the second closing tool 24 and guided by the guiding device 51 towards second closing tool 24. When the suspension element E is tensed between the closure clip C and the guiding device 51 of the feeding device 50, while the second closing element 24 and the feeding device 50 move relative to each other (pass each other in short distance), the second portion of the suspension element E is urged to the holding device 60 located at the side of the closing tool 24 in proximity to the die 25, as shown in FIG. 5. In that situation, the second portion of the suspension element E is received and releasably held by the holding element 60. The holding element continues holding the suspension element E after it is completely removed from carrier strip B and guiding device 51, as shown in FIGS. 6 and 7. After closing the closure clip C by the closing tools 22, 24, the closing tools are opened again and the suspension element E which is now attached to the sausage-like product S by the clip C, is draw out of and released from the holding device 60. Thereby, the suspension element E may be easily threaded on a bar (not shown), for example, suitably located and/or moved during the opening motion of the closing tools 22, 24.

As shown in FIG. 2, the holding element 60 may comprise at least one comb-like or brush-like element 61 having at least one row of teeth or bristles configured to receive and releasably hold the second section of the suspension element E therebetween. Preferably, but not necessarily, the teeth of the comb-like element 61 or the bristles of the brush-like element 61 are made from resilient material, such as plastic or rubber, for example, so that they are elastic and can resiliently receive the threads (or legs) of the second portion of the suspension element E.

Preferably, the holding element 60 is arranged such that the longitudinal extension of its comb-like or brush-like element 61 extends substantially perpendicular to the feeding direction F and substantially perpendicular to the moving path of the die 25 of the second closing tool 24, as can be gathered from the series of FIGS. 2 to 7.

The above described embodiment of the invention does not comprise the urging element 52 shown in FIGS. 2 to 7. The suitable movement of the suspension element E during the closing motion of the closing tools 22, 24 so as to be received by the holding device 60 is achieved by the guiding effect of the guiding device 51.

In a further development of the invention, as shown in FIGS. 2 to 7, reliability of placement and attachment of the suspension element E to the sausage-like product S may be further improved the urging element 52 attached to the feeding device 50. The urging element 52 may be attached to the guiding device 51, as shown in FIGS. 2 to 7, or may be attached to another element (not shown) of the feeding device such as a frame, for example. The urging element 52 may be a plate-like element and is arranged above the guiding device 51 and above the suspension element E located in the delivery position. It extends perpendicular to the direction of the relative movement between the closing tool 24 and the feeding device 50. The urging element 52 protrudes from the feeding device 50 towards the second closing tool 24 in order to improve reliability of establishing engagement between the suspension element E and the holding device 60. During the relative motion between the second closing element 24 and the feeding device 50, the urging element 52 passes the comb-like or brush-like element 61 of the holding element 60 in a very short distance, namely a distance shorter than the diameter of the threads or legs of the suspension element E, for example. In this manner, the second portion of the suspension element E is positively urged into engagement with the teeth or bristles of the comb-like or brush-like element 61.

In order to achieve a gentle and smooth handling of the suspension element E, the urging element 52 may be made of elastic material so as to be resilient in direction of the relative movement between the closing tool 24 and the feeding device 50. If at least one of the urging element 62 or the comb-like or brush-like element 61 (or its teeth or bristles) is resilient, the urging element 52 may pass the comb-like or brush-like element 61 without any distance or with an overlapping arrangement. Thus, the second portion of the suspension element E is even more reliably pressed (urged) into engagement with the comb-like or brush-like element 61 of the holding device 60.

As shown in FIG. 5, preferably, but not necessarily, the urging element 52 may be arranged such that it is, at the time of passing the comb-like or brush-like element 61, inclined with respect to the at least one row of the at least one comb-like or brush-like element 61 so as to pass the teeth or bristles of the at least one comb-like or brush-like element 61 one after another. This is very advantageous because the two threads or legs of the second section of the suspension element E are urged into engagement with the holding element 60 one after another. Also the forces acting between the urging element 52 and the comb-like or brush-like element 61 are reduced and distributed over a longer time interval so that noise and stress to the material are reduced.

Preferably, the teeth or bristles of the comb-like or brush-like element 61 extend substantially perpendicular to the direction of the relative movement between the second closing tool 24 and the feeding device 50, i.e. in a direction substantially parallel to the feeding direction F, as shown in FIGS. 2 to 7. This results in substantially equal forces acting on the urging element 52 and the comb-like or brush-like element 61 when passing each other in both directions during opening or closing of the closing tools 22, 24. Also similar forces are necessary for engaging and disengaging the suspension element E and the holding element 60 during closing motion and reversed opening motion of the closing tools 22, 24.

Alternatively the teeth or bristles of the comb-like or brush-like element 61 may extend inclined with respect to the direction of the relative movement between the second closing tool and the feeding device and also inclined to the feeding direction F. This results in different forces for engaging and disengaging the suspension element E and the holding element 60, which may be desirable, for example. Furthermore, such inclination may facilitate urging the second portion of the suspension element E in between the bristles or teeth of the comb-like or brush-like element 61.

In a further development of the invention, the at least one comb-like or brush-like element 61 may comprise at least two rows of teeth or bristles having different configurations of teeth or bristles. Preferably, thickness and/or spacing of the teeth or bristles may be different in order to improve reliability of engagement between the suspension element E and the holding device 60 in case the dimensions of the suspension element changes on grounds of fabrication tolerances. Furthermore, this configuration enables usage of the same holding device for different kinds of suspension elements having different thread diameters or different thread materials, for example, without requiring change of the holding device.

In a further independent development of the invention, the feeding device 50 for suspension elements E is arranged on the side of the closing tools 22, 24 facing the filling tube 10.

It has to be noted that the arrangement of the components as described above and as shown in the drawing figures for the preferred embodiments of the invention may be interchanged without deriving from the spirit of the invention. For example, the feeding device 50 shown in FIG. 2 may be arranged on right side of the second closing tool 24 to feed the suspension elements E to the other side of the tool 24. Furthermore, it has to be noted that a more or less fixedly arranged feeding device 50 has been described above in connection with the preferred embodiments of the invention. However, it is clear that the relative movement between the second closing tool 24 and the feeding device 50 is relevant, so that also other configurations are feasible having a fixedly arranged second closing tool 24 and a moving feeding device 50, for example.

What is claimed is:

1. A clipping machine for producing sausages and sausage-shaped products, by filing a flowable filling material into a tubular or bag-shaped packaging casing and closing said packaging casing by a closure means, the clipping machine comprises a filling tube for feeding the filling material into the tubular or bag-shaped packaging casing stored on the filling tube and closed at its first end;

gathering means for gathering the filled tubular or bag-shaped packaging casing and for forming a plait-like portion thereto;

a clipping device having a first closing tool and a second closing tool, at least one of which being reversibly movable between an opened position and a closed position, wherein at least the second closing tool comprises a die configured to receive at least one closure means, and wherein the closing tools are configured to apply the at least one closure means to the plait-like portion and to close said closure means when the closing tools are brought into their closed position; and a feeding device for suspension elements configured to feed suspension elements attached to a carrier strip to a delivery position and to place a first section of a suspension element within the closure means positioned on the die of the second closing tool; wherein the feeding device further comprises a guiding device configured to guide the suspension element close to the carrier strip while the suspension element is pulled off and detached from the carrier strip by a relative movement between the second clipping tool and the feeding device; and a holding device attached to the second closing tool and configured to releasably receive and hold a second section of the suspension element when detached from the carrier strip.

2. The clipping machine according to claim 1,
wherein the holding device comprises at least one comb-like or brush-like element having at least one row of teeth or bristles configured to receive and releasably hold the second section of the suspension element therebetween.

3. The clipping machine according to claim 2,
wherein teeth or bristles of the comb-like or brush-like element are resilient.

4. The clipping machine according to claim 2,
wherein the teeth or bristles of the comb-like or brush-like element extend substantially perpendicular to the direction of the relative movement between the second closing tool and the feeding device.

5. The clipping machine according to claim 2,
wherein the teeth or bristles of the comb-like or brush-like element extend inclined with respect to the direction of the relative movement between the second closing tool and the feeding device.

6. The clipping machine according to claim 2,
wherein the at least one comb-like or brush-like element comprises at least two rows of teeth or bristles having different configurations of teeth or bristles.

7. The clipping machine according to claim 1,
wherein the feeding device further comprises an urging element arranged to pass the holding device and to urge the second section of the suspension element into engagement with the holding device while the first and second closing tools are brought into their closed position.

8. The clipping machine according to claim 7,
wherein the urging element is resilient.

9. The clipping machine according to claim 8,
wherein the urging element is arranged to contact the teeth or bristles of the comb-like or brush-like element while passing the holding device.

10. The clipping machine according to claim 7,
wherein the urging element is arranged to contact the teeth or bristles of the comb-like or brush-like element while passing the holding device.

11. The clipping machine according to claim 7,
wherein the urging element is inclined with respect to the at least one row of the at least one comb-like or brush-like element so as to pass the teeth or bristles of the at least one comb-like or brush-like element one after another.

\* \* \* \* \*